US009755882B2

(12) United States Patent
Jain et al.

(10) Patent No.: US 9,755,882 B2
(45) Date of Patent: Sep. 5, 2017

(54) SMALL DATA TECHNIQUES AND CONFIGURATIONS IN A WIRELESS COMMUNICATION NETWORK

(75) Inventors: Puneet K. Jain, Hillsboro, OR (US); Meghashree Dattatri Kedalagudde, Hillsboro, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/996,320

(22) PCT Filed: Mar. 28, 2012

(86) PCT No.: PCT/US2012/031042
§ 371 (c)(1),
(2), (4) Date: Jun. 20, 2013

(87) PCT Pub. No.: WO2013/066388
PCT Pub. Date: May 10, 2013

(65) Prior Publication Data
US 2013/0279372 A1      Oct. 24, 2013

Related U.S. Application Data

(60) Provisional application No. 61/556,109, filed on Nov. 4, 2011.

(51) Int. Cl.
*H04W 4/00*     (2009.01)
*H04L 27/26*    (2006.01)
(Continued)

(52) U.S. Cl.
CPC ......... *H04L 27/2675* (2013.01); *H04B 7/024* (2013.01); *H04B 7/0456* (2013.01);
(Continued)

(58) Field of Classification Search
CPC ... H04L 5/0055; H04L 5/0078; H04L 1/1812; H04L 27/2675; H04L 1/0026;
(Continued)

(56) References Cited

U.S. PATENT DOCUMENTS

| 9,113,355 B2 * | 8/2015 | Liao ...................... H04W 4/005 |
| 2007/0169107 A1 | 7/2007 | Huttunen |

(Continued)

FOREIGN PATENT DOCUMENTS

| CN | 102056265 A | 5/2011 |
| CN | 102202412 A | 9/2011 |

(Continued)

OTHER PUBLICATIONS

3GPP, "Technical Specification Group Services and System Aspects; System Improvements for Machine-Type Communications; (Release 11)", 3GPP TR 23.888 V1.5.0 (Oct. 2011), pp. all.*

(Continued)

*Primary Examiner* — Jeffrey M Rutkowski
*Assistant Examiner* — Shah Rahman
(74) *Attorney, Agent, or Firm* — Schwabe, Williamson & Wyatt, P.C.

(57) ABSTRACT

Embodiments of the present disclosure describe techniques and configurations for triggering transmission of data payloads in a wireless communication network. An apparatus may include one or more computer-readable media having instructions and one or more processors coupled with the one or more computer-readable media and configured to execute the instructions to implement an interworking function (IWF) to receive, from a Machine Type Communication (MTC) server, a trigger request to trigger sending of a data payload over a wireless communication network, the data payload being smaller than a preconfigured threshold, and send, in response to the trigger request over a reference point (Continued)

to a module including a Mobility Management Entity (MME) or a Serving GPRS (General Packet Radio Service) Support Node (SGSN), a trigger notification to trigger sending of the data payload over the wireless communication network.

29 Claims, 7 Drawing Sheets

(51) Int. Cl.

| | | |
|---|---|---|
| *H04W 72/04* | (2009.01) | |
| *H04B 7/024* | (2017.01) | |
| *H04B 7/0456* | (2017.01) | |
| *H04W 4/06* | (2009.01) | |
| *H04W 24/02* | (2009.01) | |
| *H04W 72/08* | (2009.01) | |
| *H04W 52/24* | (2009.01) | |
| *H04J 3/12* | (2006.01) | |
| *H04L 5/00* | (2006.01) | |
| *H04L 5/14* | (2006.01) | |
| *H04W 52/14* | (2009.01) | |
| *H04W 68/02* | (2009.01) | |
| *H04L 1/00* | (2006.01) | |
| *H04W 76/00* | (2009.01) | |
| *H04W 76/02* | (2009.01) | |
| *H04J 11/00* | (2006.01) | |
| *H04L 1/18* | (2006.01) | |
| *H04W 56/00* | (2009.01) | |
| *H04B 7/06* | (2006.01) | |
| *H04W 72/02* | (2009.01) | |
| *H04W 52/34* | (2009.01) | |
| *H04W 84/14* | (2009.01) | |
| *H04W 88/02* | (2009.01) | |
| *H04W 88/08* | (2009.01) | |
| *H04W 72/12* | (2009.01) | |

(52) U.S. Cl.
CPC .............. *H04B 7/0626* (2013.01); *H04J 3/12* (2013.01); *H04J 11/00* (2013.01); *H04L 1/0026* (2013.01); *H04L 1/0077* (2013.01); *H04L 1/1812* (2013.01); *H04L 5/0035* (2013.01); *H04L 5/0053* (2013.01); *H04L 5/0055* (2013.01); *H04L 5/0078* (2013.01); *H04L 5/14* (2013.01); *H04L 27/2646* (2013.01); *H04L 27/2662* (2013.01); *H04W 4/005* (2013.01); *H04W 4/06* (2013.01); *H04W 24/02* (2013.01); *H04W 52/146* (2013.01); *H04W 52/242* (2013.01); *H04W 56/0015* (2013.01); *H04W 68/02* (2013.01); *H04W 72/02* (2013.01); *H04W 72/042* (2013.01); *H04W 72/0413* (2013.01); *H04W 72/085* (2013.01); *H04W 76/002* (2013.01); *H04W 76/021* (2013.01); *H04W 52/244* (2013.01); *H04W 52/34* (2013.01); *H04W 72/12* (2013.01); *H04W 84/14* (2013.01); *H04W 88/02* (2013.01); *H04W 88/08* (2013.01); *Y02B 60/50* (2013.01)

(58) Field of Classification Search
CPC .............. H04L 1/0077; H04L 27/2646; H04L 27/2662; H04L 5/0035; H04L 5/0053; H04L 5/14; H04L 5/22; H04W 24/02; H04W 4/005; H04W 4/06; H04W 68/02; H04W 72/042; H04W 76/021

USPC .............. 370/254, 329, 280, 311, 312, 336; 713/400
See application file for complete search history.

(56) References Cited

U.S. PATENT DOCUMENTS

| | | | |
|---|---|---|---|
| 2010/0124191 A1* | 5/2010 | Vos et al. ..................... 370/328 |
| 2011/0199905 A1* | 8/2011 | Pinheiro .............. H04W 4/005 370/235 |
| 2011/0213871 A1 | 9/2011 | DiGirolamo et al. |
| 2011/0299492 A1* | 12/2011 | Lee et al. ..................... 370/329 |
| 2012/0243422 A1* | 9/2012 | Jokimies et al. ............. 370/242 |
| 2012/0252481 A1* | 10/2012 | Anpat et al. ............... 455/456.1 |
| 2012/0254890 A1* | 10/2012 | Li ......................... H04W 4/005 719/313 |
| 2012/0282956 A1* | 11/2012 | Kim et al. ..................... 455/466 |
| 2012/0302229 A1* | 11/2012 | Ronneke .......... H04L 29/12754 455/422.1 |
| 2013/0080597 A1* | 3/2013 | Liao ..................... H04W 4/005 709/219 |
| 2013/0100895 A1* | 4/2013 | Aghili et al. ................. 370/329 |
| 2013/0155954 A1* | 6/2013 | Wang .................. H04W 4/005 370/328 |

FOREIGN PATENT DOCUMENTS

| | | | | |
|---|---|---|---|---|
| WO | WO 2011098150 A1 * | 8/2011 | ............. H04L 29/12 |
| WO | WO 2011163561 A1 * | 12/2011 | ............. H04W 8/20 |

OTHER PUBLICATIONS

3GPP, "Technical Specification Group Terminals; Technical realization of the Short Message Service (SMS); Point-to-Point (PP) (3G TS 23.040 version 2.0.0)", 3GPP TS 23.040 V2.0.0 (Jun. 1999), pp. 6, 12.*
HTC, "Solution of Suppressing Device Trigger", May 16-20, 2011, 3GPP SA WG2, SA WG2 Meeting #85 S2-112259, pp. all.*
3GPP, "Technical Specification Group Services and System Aspects; System Improvements for Machine-Type Communications; (Release 11)," 3GPP TR 23.888 V1.6.0 (Nov. 2011), LTE, 161 pages.
3GPP, "Technical Specification Group Services and System Aspects; Architecture Enhancements to facilitate communications with Packet Data Networks and Applications; (Release 11)," 3GPP TS 23.682 V0.21.0 (Feb. 2012), LTE, 30 pages (Amended).
3GPP, "Technical Specification Group Services and System Aspects; Architecture Enhancements to facilitate communications with Packet Data Networks and Applications; (Release 11)," 3GPP TS 23.682 V0.2.0 (Feb. 2012), LTE, 23 pages.
3GPP, "Technical Specification Group Services and System Aspects; Architecture Enhancements to facilitate communications with Packet Data Networks and Applications; (Release 11)," 3GPP TS 23.682 V0.1.0 (Nov. 2011), LTE, 19 pages.
International Preliminary Examining Authority, Notification of transmittal of international preliminary report on patentability for PCT/US2012/031042 mailed on May 12, 2014.
International Bureau of WIPO, Notification concerning transmittal of international preliminary report on patentability for PCT/US2012/031042 mailed on May 15, 2014.
International Search Report and Written Opinion mailed Jun. 28, 2012 from International Application No. PCT/US2012/031042.
3GPP, "Technical Specification Group Services and System Aspects; System Improvements for Machine-Type Communications; (Release 10)," 3GPP TR 23.888V0.3.2, Mar. 2010, Lte, See clauses 4.3, 5.4, 5.5 and figures 4.3-1,6.18-.2-1.
3GPP, "Technical Specification Group Services and System Aspects; Architecture Enhancements to facilitate communications with Packet Data Networks and Applications; (Release 11)," 3GPP TS 23.682 V0.2.0, Feb. 2012, See sections 4 and 5.
Extended European Search Report issued May 13, 2015 from European Patent Application No. 12846449.2.

(56) References Cited

OTHER PUBLICATIONS

3GPP, System Improvements for Machine-Type Communications (Release 11), 3GPP TR 23.888 V1.5.0 (Oct. 2011), Lte, 155 pages.
Office Action issued Apr. 14, 2015 from Japanese Patent Application No. 2014-539923.
LG Electronics, "Two solutions for Online Small Data transmission," 3GPP TSG SA WG2 Meeting #70, TD S2-102524, Agenda Item: 9.5, May 10-14, 2010, Kyoto, Japan, 6 pages.
Nokia Siemens Networks, Nokia, "Solutions for MTC Device Trigger," SA WG2 Meeting #87, S2-114198, Agenda Item: 9.10.5, Oct. 10-14, 2011, Jeju Island, South Korea, 8 pages.
Huawei, Hisillcon, "MTC trigger considerations," SA WG2 Meeting #87, S2-114187, Agenda Item: 9.10.5, Oct. 10-14, 2011, Jeju, Korea, 5 pages.
ZTE, "NAS PDU based Small Data Transmission," SA WG2 Meeting #86, S2-113083, Agenda Item: 9.4.2.6, Jul. 11-15, 2011, Naantali, Finland, 5 pages.
Office Action issued Jan. 26, 2016 from Korean Patent Application No. 2014-7012171.
Office Action Oct. 19, 2015 for Russian Patent Application No. 2014117667; 6 pages.
Office Action issued Jun. 28, 2016 from Japanese Patent Application No. 2014-539923, 5 pages.
Office Action issued Mar. 1, 2016 from Japanese Patent Application No. 2014-539923, 14 pages.
HTC, "Load/Overload Control via MTC-IWF," SA WG2 Meeting #87, S2-114523, Agenda Item: 9.10.5, Sep. 10-14, 2011, Jeju, Korea, 7 pages.
Office Action issued Jan. 20, 2017 from Chinese Patent Application No. 201280054246.6, 22 pages.

\* cited by examiner

FIG. 7

| Octets | Bits 8 | 7 | 6 | 5 | 4 | 3 | 2 | 1 |
|---|---|---|---|---|---|---|---|---|
| 1 | Type = 1 (decimal) ||||||||
| 2 to 3 | Length = n ||||||||
| 4 | Spare |||| Instance ||||
| 5 | Number digit 2 |||| Number digit 1 ||||
| 6 | Number digit 4 |||| Number digit 3 ||||
| ... | ... |||| ... ||||
| n+4 | Number digit m |||| Number digit m-1 ||||

FIG. 8

| Octets | Bits 8 | 7 | 6 | 5 | 4 | 3 | 2 | 1 |
|---|---|---|---|---|---|---|---|---|
| 1 | Type ||||||||
| 2 to 3 | Length = n ||||||||
| 4 | Spare |||| Instance ||||
| 5 | Validity Period ||||||||
| 6 to (n+4) | These Octet(s) are present if explicitly specified ||||||||

FIG. 9

| Octets | Bits 8 | 7 | 6 | 5 | 4 | 3 | 2 | 1 |
|---|---|---|---|---|---|---|---|---|
| 1 | Type ||||||||
| 2 to 3 | Length = n ||||||||
| 4 | Spare |||| Instance ||||
| 5 to (n+4) | Generic Data Container ||||||||

FIG. 10

| Octets | Bits 8 | 7 | 6 | 5 | 4 | 3 | 2 | 1 |
|---|---|---|---|---|---|---|---|---|
| 1 | Type ||||||||
| 2 to 3 | Length = n ||||||||
| 4 | Spare |||| Instance ||||
| 5 to (n+4) | Priority ||||||||

SMALL DATA TECHNIQUES AND CONFIGURATIONS IN A WIRELESS COMMUNICATION NETWORK

CROSS REFERENCE TO RELATED APPLICATIONS

The present application is a national phase entry under 35 U.S.C. §371 of International Application No. PCT/US2012/031042, filed Mar. 28, 2012, entitled "SMALL DATA TECHNIQUES AND CONFIGURATIONS IN A WIRELESS COMMUNICATION NETWORK", which designates the United States of America, and which claims priority to U.S. Provisional Patent Application No. 61/556,109, filed Nov. 4, 2011, the entire contents and disclosures of which are hereby incorporated by reference in their entireties.

FIELD

Embodiments of the present disclosure generally relate to the field of wireless communication systems, and more particularly, to small data techniques and configurations in a wireless communication network such as, for example, techniques and configurations for transmitting small data payloads.

BACKGROUND

Mobile networks that facilitate transfer of information at broadband rates continue to be developed and deployed. Such networks may be colloquially referred to herein as broadband wireless access (BWA) networks. A variety of different device types may be used in broadband wireless technologies. Such devices may include, for example, personal computers, smartphones, laptops, netbooks, ultrabooks, tablets, handheld devices, and other consumer electronics such as music players, digital cameras, etc., that are configured to communicate over the wireless broadband networks.

Machine-to-Machine (M2M) may refer to technologies that allow wireless and wired systems to communicate with other devices without any human intervention. M2M may use a device such as, for example, a sensor or meter to collect information, which may be relayed through a network (e.g., wireless, wired, or hybrid) to an application that translates the information into meaningful data. The expansion of BWA networks across the world and accompanying increased speed/bandwidth and reduced power of wireless communication has facilitated growth of M2M communication. Although the amount of data sent by M2M devices is very small, a large number of these devices, in combination, may increase a load on a network. Current techniques for transmitting small data payloads such as machine type communication (MTC) data may be inefficient or incompatible with emerging BWA networks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 7 schematically illustrates an example International Mobile Subscriber Identity (IMSI) Information Element, in accordance with some embodiments.

FIG. 8 schematically illustrates an example Validity Period Information Element, in accordance with some embodiments.

FIG. 9 schematically illustrates an example Generic Data Container Information Element, in accordance with some embodiments.

FIG. 10 schematically illustrates an example Priority Information Element, in accordance with some embodiments.

DETAILED DESCRIPTION

Figure 1:
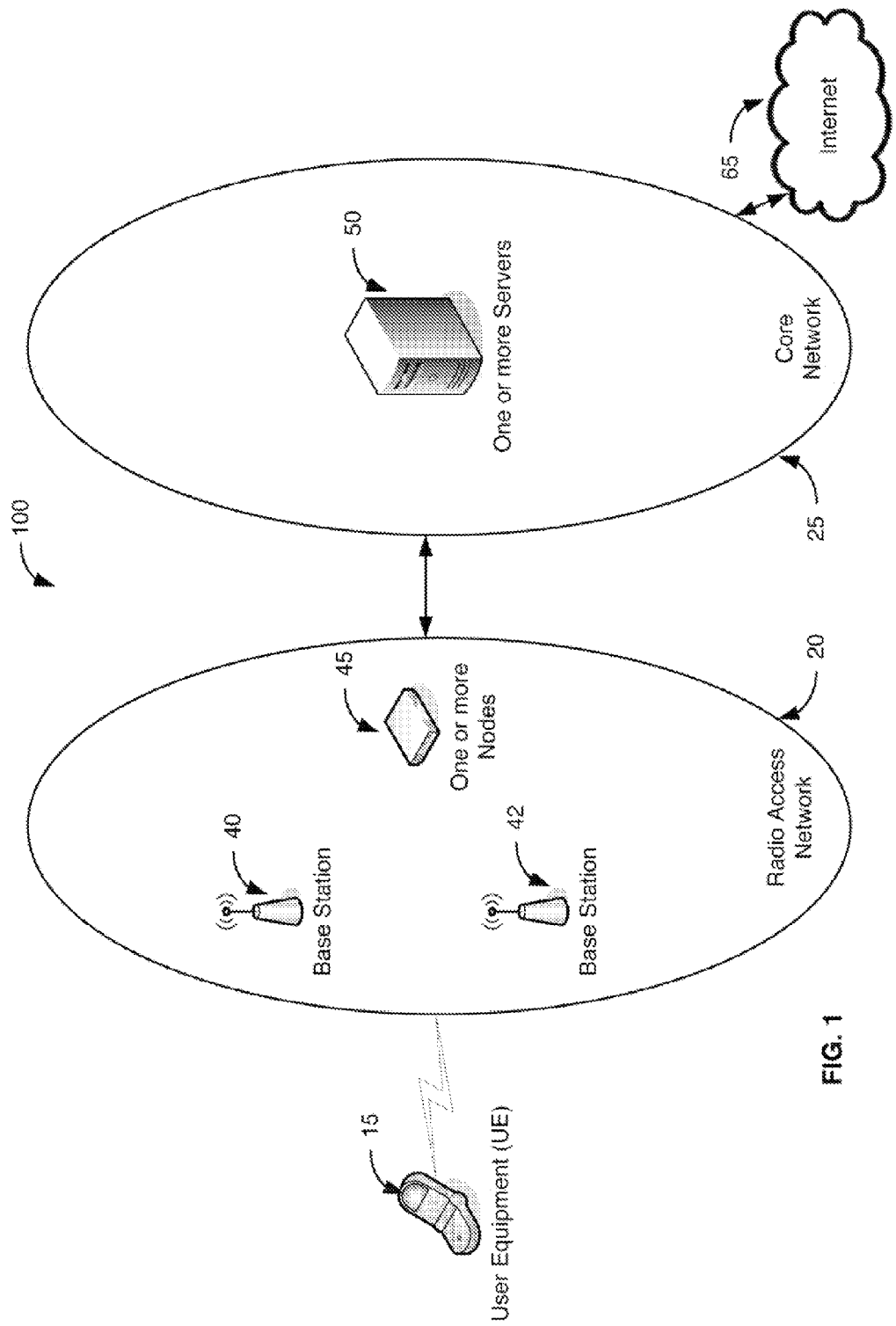
FIG. 1 schematically illustrates an example broadband wireless access (BWA) network in accordance with some embodiments.

Embodiments of the present disclosure provide small data techniques and configurations in a wireless communication network including techniques and configurations for triggering transmission of small data payloads such as, for example, Machine Type Communication (MTC) data, monitoring small data communications, and signaling improvements of the same. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application-Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Example embodiments may be described herein in relation to broadband wireless access (BWA) networks including networks operating in conformance with one or more protocols specified by the $3^{rd}$ Generation Partnership Project (3GPP) and its derivatives, the WiMAX Forum, the Institute for Electrical and Electronic Engineers (IEEE) 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards. In other embodiments, communication schemes described herein may be compatible with additional/alternative communication standards, specifications, and/or protocols. For example, embodiments of the present disclosure may be applied to other types of wireless networks where similar advantages may be obtained. Such networks may include, but are not limited to, wireless local area networks (WLANs), wireless personal area networks (WPANs) and/or wireless wide area networks (WWANs) such as cellular networks and the like.

The following embodiments may be used in a variety of applications including transmitters and receivers of a mobile wireless radio system. Radio systems specifically included within the scope of the embodiments include, but are not limited to, network interface cards (NICs), network adaptors, base stations, access points (APs), relay nodes, enhanced node Bs, gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

FIG. 1 schematically illustrates an example broadband wireless access (BWA) network 100 in accordance with some embodiments. The BWA network 100 may include one or more radio access networks (hereinafter "RAN 20") and a core network 25.

User Equipment (UE) 15 may access the core network 25 via a radio link ("link") with a base station (BS) such as, for example, one of base stations 40, 42, etc., in the RAN 20. The UE 15 may, for example, be a subscriber station that is configured to communicate with the base stations 40, 42 in conformance with one or more protocols. The following description is provided for an example BWA network 100 that conforms with 3GPP for ease of discussion; however, subject matter of the present disclosure is not limited in this regard and the described embodiments may apply to other networks that benefit from the principles described herein. In some embodiments, the base stations 40, 42 may include enhanced Node B (eNB) stations and a UE 15 that is configured to communicate using a multiple-input and multiple-output (MIMO) communication scheme. One or more antennas of the UE 15 may be used to concurrently utilize radio resources of multiple respective component carriers (e.g., which may correspond with antennas of eNB stations 40, 42) of the BWA network 100. The UE 15 may be configured to communicate using Orthogonal Frequency Division Multiple Access (OFDMA) in, e.g., downlink communications, and/or Single-Carrier Frequency Division Multiple Access (SC-FDMA) in, e.g., uplink communications in some embodiments.

While FIG. 1 generally depicts the UE 15 as a cellular phone, in various embodiments the UE 15 may be a personal computer (PC), a notebook, ultrabook, netbook, smartphone, an ultra mobile PC (UMPC), a handheld mobile device, an universal integrated circuit card (UICC), a personal digital assistant (PDA), a Customer Premise Equipment (CPE), a tablet, or other consumer electronics such as MP3 players, digital cameras, and the like. The base stations 40, 42 may include one or more antennas, one or more radio modules to modulate and/or demodulate signals transmitted or received on an air interface, and one or more digital modules to process signals transmitted and received on the air interface.

In some embodiments, communication with the UE 15 via RAN 20 may be facilitated via one or more nodes 45. The one or more nodes 45 may act as an interface between the core network 25 and the RAN 20. According to various embodiments, the one or more nodes 45 may include a Mobile Management Entity (MME) (e.g., SGSN/MME 58 of FIG. 2) that is configured to manage signaling exchanges (e.g., authentication of the UE 15) between the base stations 40, 42 and the core network 25 (e.g., one or more servers 50), a Packet Data Network Gateway (PGW) (e.g., GGSN/PGW 51 of FIG. 2) to provide a gateway router to the Internet 65, and/or a Serving Gateway (SGW) to manage user data tunnels or paths between the base stations 40, 42 of the RAN 20 and the PGW. Other types of nodes may be used in other embodiments.

The core network 25 may include logic (e.g., a module) to provide authentication of the UE 15 or other actions associated with establishment of a communication link to provide a connected state of the UE 15 with the BWA network 100. For example, the core network 25 may include one or more servers 50 that may be communicatively coupled to the base stations 40, 42. In an embodiment, the one or more servers 50 may include a Home Subscriber Server (HSS) (e.g., HLR/HSS 56 of FIG. 2), which may be used to manage user parameters such as a user's International Mobile Subscriber Identity (IMSI), authentication information, and the like. The core network 25 may include other servers, interfaces, and modules some of which are further described in connection with FIG. 2. The one or more servers 50 may include over-the-air (OTA) servers in some embodiments. In some embodiments, logic associated with different functionalities of the one or more servers 50 may be combined to reduce a number of servers, including, for example, being combined in a single machine or module.

According to various embodiments, the BWA network 100 is an Internet Protocol (IP) based network. For example, the core network 25 may be an IP based network. Interfaces between network nodes (e.g., the one or more nodes 45) may be based on IP, including a backhaul connection to the base stations 40, 42. In some embodiments, the BWA network 100 includes a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. In some embodiments, the RAN 20 may include GSM EDGE Radio Access Network (GERAN) where EDGE stands for Enhanced Data for GSM Evolution, Universal Terrestrial Radio Access Network (UTRAN), or Evolved UTRAN (E-UTRAN). The BWA network 100 may operate in accordance other network technologies in other embodiments.

Figure 2:
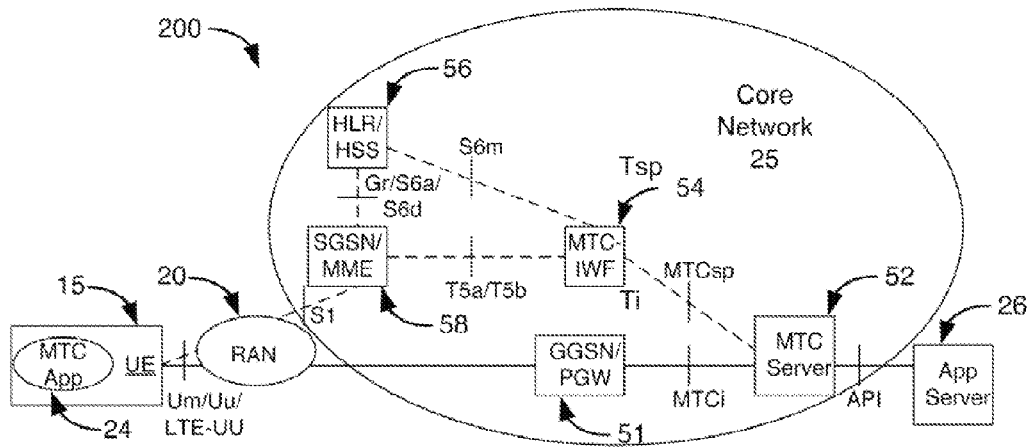
FIG. 2 schematically illustrates system architecture configured to perform small data payload techniques and configurations described herein, in accordance with some embodiments.

FIG. 2 schematically illustrates system architecture 200 configured to perform small data payload techniques and configurations described herein, in accordance with some embodiments. The system architecture 200 may be configured to efficiently perform small data transmissions intended for use with Machine-to-Machine (M2M) communication such as, for example, MTC communication. For example, UE 15 may include or be communicatively coupled with smart meters or sensors to collect small amounts of information for transmission (e.g., health monitoring devices, vending machines, and the like configured to collect information about temperature, inventory, etc.). In some embodiments, an Application server 26 may be configured to request an MTC server 52 to trigger sending of a small data payload over a wireless communication network (e.g., BWA network 100 of FIG. 1). For example, the Application server 26 may request MTC information from the UE 15 such as sensor or meter measurement, inventory level, etc. The data payload (e.g., MTC data payload) may be smaller than a preconfigured threshold to define a small data payload in some embodiments. The preconfigured threshold may be set by subscription or network operator policy in some embodiments.

According to various embodiments, the small data payload may be sent by the UE 15 to the MTC server 52 or Application server 26 via RAN 20 and core network 25 or the small data payload may be sent by the Application server 26 or MTC server 52 to the UE 15 via the core network 25 and the RAN 20. For example, the Application server 26 may be configured (e.g., by an MTC user) to send or trigger sending of a small data payload to UE 15. The Application server 26 may be communicatively coupled with the core network 25 using, for example, an Internet connection (e.g., Internet 65 of FIG. 1). In another example, an MTC application 24 that is communicatively coupled with the UE 15 may be configured to send or trigger the sending of a small data payload to the Application server 26. In some embodiments, the UE 15 is an MTC device configured to send or receive small data payloads and/or communicate with the MTC application 24. In some embodiments, the UE 15 may include the MTC application 24 within the structure of the UE 15. In other embodiments, the MTC application 24 may be communicatively coupled with the UE 15.

The MTC server 52 may be configured to connect to the core network 25 to communicate with UEs (e.g., UE 15) that are configured for MTC communication. The MTC server 52 may be further configured to communicate with an Interworking Function (IWF) such as MTC-IWF 54 to trigger a transmission of a small data payload. In some embodiments, the MTC server 52 may be referred to as a Services Capability Server (SCS).

The MTC-IWF 54 may terminate an Tsp reference point or interface (hereinafter "reference point") between the MTC server 52 and the MTC-IWF 54. The MTC-IWF 54 may be configured to hide internal public land mobile network (PLMN) topology and relay or translate signaling protocols used over the Tsp reference point to invoke specific functionality in the PLMN. In some embodiments, the MTC-IWF 54 may authenticate the MTC server 52 before communication is established with the core network 25 and/or control plane requests from the MTC server 52 are authorized. According to various embodiments, the dashed lines between modules (e.g., 54, 58) represent a control plane and the solid lines between modules represent a user plane. While a particular plane may be shown between modules, other embodiments may include additional/alternative planes.

In one embodiment, the MTC-IWF 54 may terminate a T5a/T5b reference point between a module including a Mobility Management Entity (MME) and/or a Serving GPRS (General Packet Radio Service) Support Node (SGSN) such as, for example, SGSN/MME 58. In some embodiments, the T5a reference point may terminate on the SGSN of the SGSN/MME 58 and the T5b reference point may terminate on the MME of the SGSN/MME 58. In another embodiment, the MTC-IWF 54 may terminate an S6m reference point between a module including a Home Location Register (HLR) and/or Home Subscriber Server (HSS) such as, for example, HLR/HSS 56. The T5a/T5b and S6m reference points are not limited to the example names provided and may be referred to by other names in other embodiments.

According to various embodiments, the T5a/T5b reference point may be used to send control packet information to a network (e.g., a 3GPP PLMN) based on an indication from the MTC server 52. The S6m reference point may be used to derive routing information for a downlink small data payload by obtaining a network identifier (e.g., 3GPP internal device identifier such as IMSI or Mobile Station International Subscriber Directory Number (MSISDN)) from an MTC device identifier or MTC application identifier. The routing information may include, for example, identities of the UE's serving Core Network (CN) nodes.

The system architecture 200 may further include Gr/S6a/S6d reference points between the HLR/HSS 56 and the SGSN/MME 58, reference point Ti between the MTC server 52 and the GGSN/PGW 51, reference point Application Programming Interface (API) between the Application server 26 and the MTC server 52, reference point S1 between the SGSN/MME 58 and the RAN 20, and reference points Um/Uu/LTE-UU between the RAN 20 and the UE 15.

The system architecture 200 may support transmission of small data payloads with little network impact such as signaling overhead, network resources, or delay for reallocation. In some embodiments, the UE 15 may be attached (e.g., by an established Radio Resource Control (RRC) connection) or detached from the RAN 20 before transmission of the small data payload (e.g., when the small data payload transmission is triggered). The UE 15 may be in connected mode or idle mode when the small data payload transmission is triggered in some embodiments. In some embodiments, when the UE 15 is in idle mode, the system architecture 200 may be configured to preferentially send the small data payload over the T5a/T5b reference point. The system architecture 200 may be configured to send the small data payload over other reference points in other embodiments.

Figure 3:
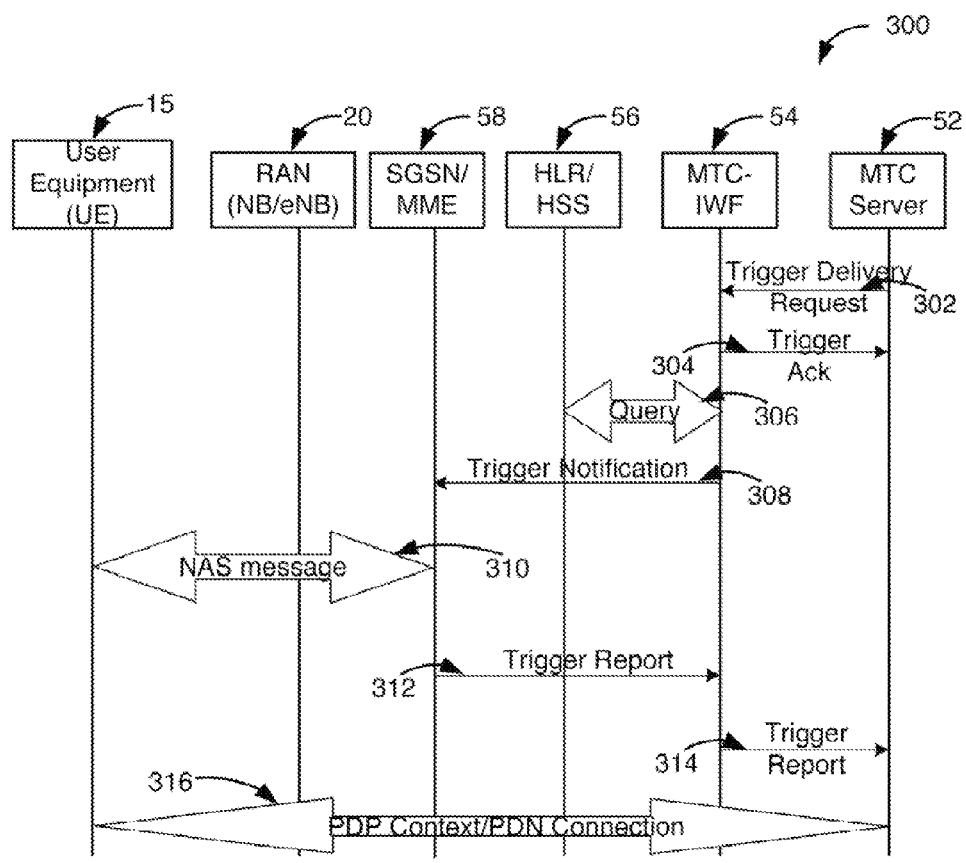
FIG. 3 schematically illustrates an example triggering scheme for transmission of a small data payload, in accordance with some embodiments.

FIG. 3 schematically illustrates an example triggering scheme 300 for transmission of a small data payload, in accordance with some embodiments. Referring to FIGS. 2 and 3, at 302, the MTC server 52 may send a trigger delivery request (hereinafter "trigger request") to the MTC-IWF 54 to trigger transmission of a small data payload. In some embodiments, the small data payload may be included in the trigger request for downlink transmission to the UE 15 from the MTC server 52 or the small data payload may be at the UE 15 and the trigger request may trigger an uplink transmission of the small data payload from the UE 15 to the MTC server 52. In a case where the trigger request is to trigger transmission of a small data payload from the UE 15 to the MTC server 52, the trigger request may include another small data payload for downlink delivery to the UE 15 from the MTC server 52 in some embodiments. The trigger request may be sent over the Tsp reference point in some embodiments. The trigger request may include an MTC device identification (ID) and/or an MTC application (e.g., MTC application 24) ID in the trigger to indicate a target UE (e.g., UE 15) for transmission of the small data payload. In some embodiments, the Application server 26 may directly send the small data payload to the MTC-IWF 54. In some embodiments, a secure connection may be established between the MTC-IWF 54 and the MTC server 52 for sending of the trigger request at 302.

At 304, the MTC-IWF 54 may send a trigger acknowledgement to the MTC server 52. The trigger acknowledgement may be sent in response to the trigger request sent at 302. In some embodiments, the MTC-IWF 54 is configured to send the trigger acknowledgement only if there is a problem with delivery of the trigger. For example, the MTC-IWF 54 may be configured to send the trigger acknowledgement when the MTC-IWF 54 is unable to process the trigger request (e.g., MTC-IWF overload).

At 306, in response to receiving the trigger request at 302, the MTC-IWF 54 may query the HLR/HSS 56 to obtain routing information for delivery of the trigger (e.g., trigger notification) and/or small data payload to the UE 15 over the T5a/T5b reference point. In some embodiments, the MTC-IWF 54 may send the MTC device ID to the HLR/HSS 56, which may have the MTC Device ID as part of an MTC subscription. The HLR/HSS 56 may map the MTC Device ID to an IMSI of the UE 15 and send the IMSI along with an address for the SGSN/MME 58 back to the MTC-IWF 54. A trust relation may be established between the MTC-IWF 54 and the HLR/HSS 56 in some embodiments (e.g., when the MTC-IWF 54 is outside of a domain of an operator of the core network). In response to receiving the query at 306 from the MTC-IWF 54, the HLR/HSS 56 may send to the MTC-IWF 54 IMSI serving node identities and/or other information such as operator policy, authorization information, failure indication with cause value, and the like. The trigger acknowledgement may be sent, at 304, in response to information sent from the HLR/HSS 56 to the MTC-IWF 54 in response to the query, at 306, in some embodiments. In other embodiments, routing information may be cached or otherwise stored at the MTC-IWF 54 and the query at 306 may not be performed.

At 308, the MTC-IWF 54 may send a trigger notification to the SGSN/MME 58. In some embodiments, the trigger notification may be sent in response to the trigger request sent at 302 to indicate triggering of transmission of the small data payload over the wireless communication network (e.g., over the T5a/T5b reference point). The trigger notification may be sent to the SGSN/MME 58 over the T5a/T5b reference point. In some embodiments, the trigger notification may include the small data payload.

At 310, the SGSN/MME 58 may send a message to indicate the trigger notification (e.g., received at 308) to the UE 15. The message may be, for example, a Non-Access Stratum (NAS) message that includes the trigger request (e.g., sent at 302 and/or 308) in a NAS payload. In embodiments where the trigger request at 302 and the trigger notification at 308 include a small data payload for downlink to the UE 15, the SGSN/MME 58 may send the small data payload to the UE 15 using uplink/downlink (UL/DL) NAS signaling (e.g., in a NAS transport message). In embodiments where the trigger request sent at 302 and the trigger notification sent at 308 do not include a small data payload, the SGSN/MME 58 may receive from the UE 15 the small data payload for uplink from the UE 15 to the MTC server 52 over the T5a/T5b reference point. In some embodiments, the UE 15 may receive the trigger request for transmission of a small data payload at 310 and establish, in response to the trigger request, a connection with the MTC server 52 (e.g., at 316) to send or receive the small data payload.

At 312, the SGSN/MME 58 may send a trigger report to the MTC-IWF 54 to indicate a success or failure of the trigger notification. For example, the SGSN/MME 58 may determine that the trigger notification was successful by receiving an indication that the trigger notification and/or the small data payload was received by the UE 15. The SGSN/MME 58 may determine that the trigger notification failed based on not receiving the indication that the trigger notification and/or the small data payload was received by the UE 15 or receiving an indication that the trigger notification and/or the small data payload was not received by the UE 15. In some embodiments, the trigger report sent at 312 may include the small data payload for uplink transmission from the UE 15 to the MTC server 52. The trigger report may be sent over the T5a/T5b reference point.

At 314, the MTC-IWF 54 may forward or otherwise send the trigger report to the MTC server 52. The trigger report may be forwarded over the Tsp reference point in some embodiments. The MTC server 52 may, for example, send the trigger report to the Application server 26. In some embodiments, the actions at 302, 304, 306, 308, 310, and/or 312 may be performed over a control plane of the wireless communication network.

At 316, a connection may be established between the UE 15 and the MTC server 52 for the transmission of the small data payload from the UE 15 to the MTC server 52 or from the MTC server 52 to the UE 15. In some embodiments, the small data payload may be transmitted using Packet Data Protocol (PDP) Context and/or a packet data network (PDN) connection. In some embodiments, if the UE 15 has an uplink small data payload to send to the MTC server 52, the UE 15 may activate PDP Context and/or PDP bearers and send uplink data on a user plane (e.g., via GGSN/PGW 51). In some embodiments, the connection may be established at 316 in response to a trigger notification received by the UE 15 at 310.

Figure 4:
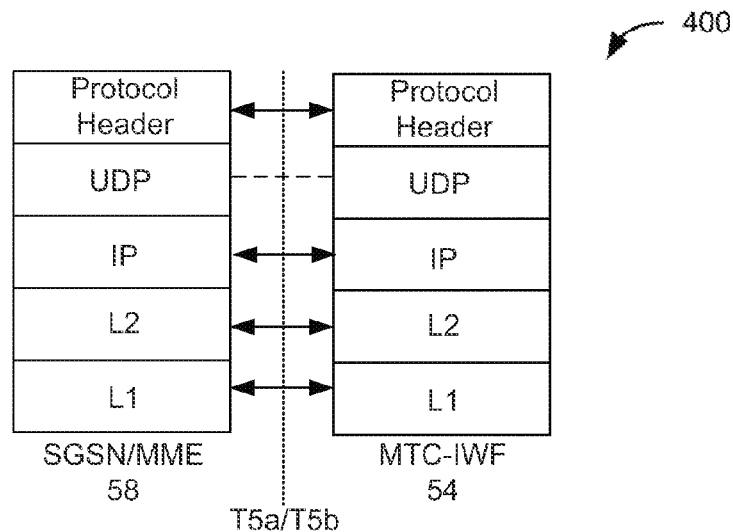
FIG. 4 schematically illustrates an example interface scheme between modules of a wireless communication system, in accordance with some embodiments.

FIG. 4 schematically illustrates an example interface scheme 400 between modules of a wireless communication system, in accordance with some embodiments. In the interface scheme 400, protocol stacks of the SGSN/MME 58 and the MTC-IWF 54 may be configured to communicate over the references points T5a/T5b, as indicated.

In some embodiments, the SGSN/MME 58 and the MTC-IWF 54 have a protocol stack that includes Layer 1 (L1), Layer 2 (L2), Internet Protocol (IP), User Datagram Protocol (UDP), and Protocol Header that are configured to communicate over the T5a/T5b reference point, as can be seen. The Protocol Header may indicate a protocol of a message being sent over the T5a/T5b reference point.

In some embodiments, the communications described herein that can be performed over the T5a/T5b reference point may comport with the interface scheme 400. For example, the trigger notification sent at 308 of FIG. 3 and/or the trigger report sent at 312 of FIG. 3 may be a message sent or received in accordance with a GPRS (General Packet Radio Service) Tunneling Protocol (GTP) or (GTP-C for control signaling) protocol (e.g., Protocol Header of FIG. 11 indicates a GTP-C message). In other embodiments, the messages sent or received at 308 and 312 of FIG. 3 may be in accordance with an MTC Application Protocol (MTC-AP). The messages (e.g., sent at 308 or 312 of FIG. 3) described herein are not limited to these protocols and may comport with other suitable protocols in other embodiments. For example, in some embodiments, the messages may comport with Diameter or Remote Authentication Dial In User Service (RADIUS) protocols or other suitable protocols.

Figure 5:
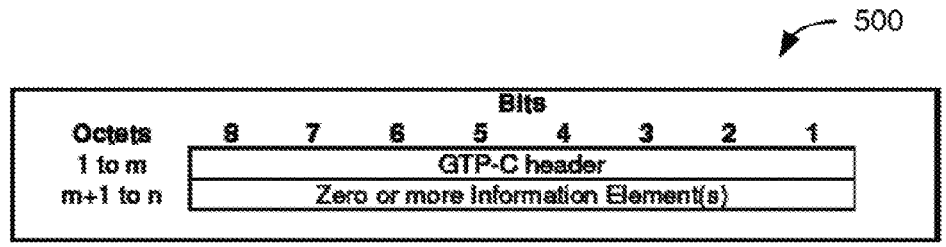
FIG. 5 schematically illustrates an example GPRS (General Packet Radio Service) Tunneling Protocol (GTP) message format, in accordance with some embodiments.

FIG. 5 schematically illustrates an example GTP message 500 format, in accordance with some embodiments. The GTP message 500 may be used in messages (e.g., sent at 308 and/or 312 of FIG. 3) that are sent over the T5a/T5b reference point in accordance with the GTP protocol.

In some embodiments, the GTP message 500 may include one or more bits to indicate features of the message. For example, in one embodiment, 1 to m octets may be used to indicate a GTP-C header and m+1 to n octets may be used to indicate zero or more Information Element(s) (IEs), where m and n are integers. The GTP message 500 may have other suitable formats in other embodiments.

Figure 6:
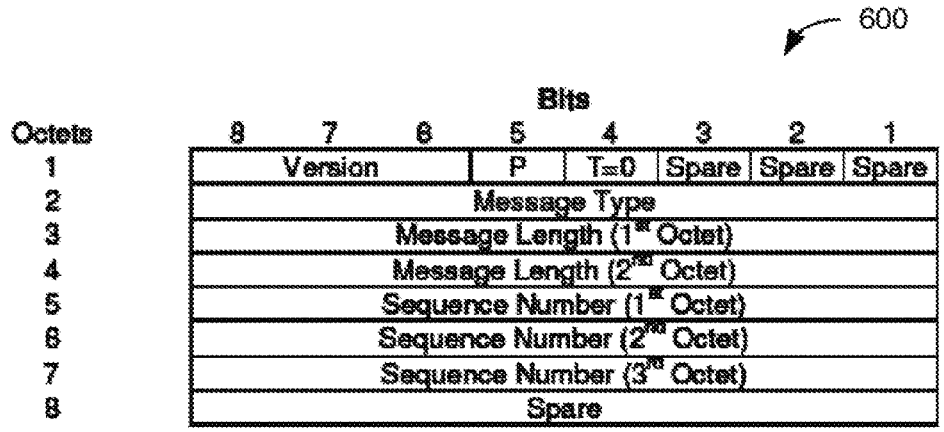
FIG. 6 schematically illustrates an example GTP header format, in accordance with some embodiments.

FIG. 6 schematically illustrates an example GTP header 600 format (e.g., for GTP-C), in accordance with some embodiments. The GTP header 600 may be used in messages (e.g., sent at 308 and/or 312 of FIG. 3) that are sent over the T5a/T5b reference point in accordance with the GTP protocol.

In some embodiments, the GTP header 600 may include one or more bits to indicate features of the message. For example, in one embodiment, the GTP header 600 may include a first octet of eight bits to indicate Version, Piggybacking flag (P), Tunnel Endpoint Identifier (TEID) flag represented by T (e.g., T=0), and/or Spare features of the message, as can be seen. In some embodiments, if a Tunnel Endpoint Identifier (TEID) is not available, the TEID field may be present in the GTP header 600 and a T flag value may be set to "0" for the trigger notification and/or the trigger report.

A second octet may indicate a Message Type. In some embodiments, the Message Type may indicate a trigger notification (e.g., sent at 308 of FIG. 3) or trigger report (e.g., sent at 312 of FIG. 3). For example, the Message Type may have a Message Type value (Decimal) of 240 to indicate the trigger notification or a Message Type value (Decimal) of 241 to indicate the trigger report. According to various embodiments, the trigger notification is an initial Message Type and the trigger report is a triggered Message Type.

A third octet may indicate a Message Length (first octet). A fourth octet may indicate a Message Length (second octet). A fifth octet may indicate a Sequence Number (first octet). A sixth octet may indicate a Sequence Number (second octet). A seventh octet may indicate a Sequence Number (third octet). An eighth octet may indicate a Spare feature. The GTP header 600 may have other suitable formats in other embodiments.

According to various embodiments, the trigger notification may include one or more IE(s). In one embodiment, the trigger notification may include IE(s) in accordance with Table 1. Table 1 may represent the IE(s) that may be used in conjunction with the GTP protocol in an embodiment.

TABLE 1

Information Elements of the Trigger Notification

| Information elements | P | Condition/Comment | IE Type | Ins. |
|---|---|---|---|---|
| Cause | CO | This may indicate the cause of triggering (e.g., to establish PDN/PDP connection or Send small data etc.) | Cause | 0 |
| UE Identity | M | IMSI/Group ID | IMSI | 0 |
| Validity Period | M | This IE indicates the duration for which the trigger is to be stored. | Validity Period | 0 |
| Priority | O | Indicates the priority | Priority | 0 |
| Generic Data Container | O | This information container indicates the trigger, optionally carries data if any. | F-Container | 0 |
| Private Extension | O | This IE may be sent on T5a/T5b interfaces. | Private extension | VS |

In Table 1, the trigger notification includes IEs for Cause, UE Identity, Validity Period, Priority, Generic Data Container, and Private Extension with Presence (P), Condition/Comment, IE Type, and Instance (Ins.) described for each. The values for Presence P may include Conditionally Optional (CO), Mandatory (M), and Optional (O). The values for IE Type include Cause, IMSI, Validity Period, Priority, F-Container and Private Extension, as can be seen. The values for Ins. include 0 and Vendor Specific (VS), as can be seen.

According to various embodiments, the Cause IE may indicate the cause of triggering. For example, the cause of triggering may be to establish a PDN/PDP connection (e.g., at 316 of FIG. 3) or to send a small data payload. The UE Identity IE may indicate the IMSI/Group ID of the UE. The Validity Period IE may indicate the duration for which the trigger is to be stored. The Priority IE may indicate the priority of the trigger message. The Generic Data Container IE may indicate the trigger and may optionally carry data (e.g., the small data payload). The Private Extension IE may be sent over the T5a/T5b reference point. The trigger notification may include more or fewer IE(s) in other embodiments.

FIG. 7 schematically illustrates an example International Mobile Subscriber Identity (IMSI) Information Element (IE) 700, in accordance with some embodiments. The IMSI IE 700 may represent an IMSI IE 700 of a trigger notification (e.g., sent at 308 of FIG. 3) in some embodiments.

According to various embodiments, the IMSI IE 700 may include a first octet of bits to indicate the type of IE (e.g., Type=1 (decimal)). The IMSI IE 700 may further include a second to third octet to indicate a Length=n. The Length field may indicate the length of the IE excluding the first four octets, which may be common for all IEs in some embodiments. The IMSI IE 700 may further include a fourth octet to indicate Spare and Instance. Instance may be a field to differentiate amongst different parameters in one specific message which may use the same IE type. The IMSI IE 700 may further include a fifth octet to indicate Validity Period.

indicate a Length=n. The Priority IE 1000 may further include a fourth octet to indicate Spare and Instance. The Priority IE 1000 may further include fifth to (n+4) octets to indicate Priority. The Priority IE 1000 may include more or fewer features or alternative arrangements than depicted in other embodiments.

According to various embodiments, the trigger report (e.g., sent at 312 of FIG. 3) may include one or more IE(s). In one embodiment, the trigger report may include IE(s) in accordance with Table 2. Table 2 may represent the IE(s) that may be used in conjunction with the GTP protocol in an embodiment.

TABLE 2

Information Elements of the Trigger Report

| Information elements | P | Condition/Comment | IE Type | Ins. |
|---|---|---|---|---|
| Cause | M | This provides success and failure of the Trigger Notification | Cause | 0 |
| UE Identity | M | IMSI/Group ID | IMSI | 0 |
| Generic Data Container | O | This information container indicates the trigger, optionally carries data if any. | F-Container | 0 |
| Private Extension | O | This IE may be sent on T5a/T5b interfaces. | Private extension | VS |

The IMSI IE 700 may further include sixth to (n+4) octets if explicitly specified. The IMSI IE 700 may include more or fewer features or alternative arrangements than depicted in other embodiments.

FIG. 8 schematically illustrates an example Validity Period Information Element (IE) 800, in accordance with some embodiments. The Validity Period IE 800 may represent a Validity Period IE 800 of a trigger notification (e.g., sent at 308 of FIG. 3) in some embodiments.

According to various embodiments, the Validity Period IE 800 may include a first octet of bits to indicate Type (e.g., IE type). The Validity Period IE 800 may further include a second to third octet to indicate a Length=n. The Validity Period IE 800 may further include a fourth octet to indicate Spare and Instance. The Validity Period IE 800 may further include fifth to (n+4) octets if explicitly specified. The Validity Period IE 800 may include more or fewer features or alternative arrangements than depicted in other embodiments.

FIG. 9 schematically illustrates an example Generic Data Container Information Element (IE) 900, in accordance with some embodiments. The Generic Data Container IE 900 may represent a Generic Data Container IE 900 of a trigger notification (e.g., sent at 308 of FIG. 3) in some embodiments.

According to various embodiments, the Generic Data Container IE 900 may include a first octet of bits to indicate Type. The Generic Data Container IE 900 may further include a second to third octet to indicate a Length=n. The Generic Data Container IE 900 may further include a fourth octet to indicate Spare and Instance. The Generic Data Container IE 900 may further include fifth to (n+4) octets for the Generic Data Container (e.g., the small data payload). The Generic Data Container IE 900 may include more or fewer features or alternative arrangements than depicted in other embodiments.

FIG. 10 schematically illustrates an example Priority Information Element (IE) 1000, in accordance with some embodiments. The Priority IE 1000 may represent a Priority IE 1000 of a trigger notification (e.g., sent at 308 of FIG. 3) in some embodiments.

According to various embodiments, the Priority IE 1000 may include a first octet of bits to indicate Type. The Priority IE 1000 may further include a second to third octet to In Table 2, the trigger notification includes IEs for Cause, UE Identity, Generic Data Container, and Private Extension with Presence (P), Condition/Comment, IE Type, and Instance (Ins.) described for each. The values for P include Mandatory (M), and Optional (O). The values for IE Type include Cause, IMSI, F-Container and Private Extension, as can be seen. The values for Ins. include 0 and Vendor Specific (VS), as can be seen.

According to various embodiments, the Cause IE may indicate the success and/or failure of the trigger notification. The UE Identity IE may indicate the IMSI/Group ID of the UE. The Generic Data Container IE may indicate the trigger and may optionally carry data (e.g., the small data payload). The Private Extension IE may be sent over the T5a/T5b reference point. The IE(s) of the trigger report may comport with embodiments described in connection with the trigger notification except where otherwise noted, in some embodiments. The trigger report may include more or fewer IE(s) in other embodiments. The features described in connection with FIGS. 5-10 may provide examples in accordance with GTP-C according to various embodiments.

According to various embodiments, the Cause IE of the trigger report or trigger notification may include values according to Table 3. Table 3 may represent the Cause value according to the GTP protocol in an embodiment. In Table 3, a message having a Request/Initial Message Type (e.g., trigger notification) may include a Cause value (decimal) from 0 to 14 to 15, as can be seen. The Cause values include a Cause value of 12 to indicate establishment of a PDN/PDP connection and a Cause value of 13 to indicate transmission of a small data payload. Further, in Table 3, a message having an Acceptance in a Response/triggered message (e.g., trigger report) may include a Cause value (decimal) from 16 to 21 to −63, as can be seen. The Cause values include a Cause value of 20 to indicate reporting of success or failure of the trigger notification.

TABLE 3

Cause Values in Cause IE

| Message Type | Cause value (decimal) | Meaning |
| --- | --- | --- |
| | 0 | Reserved. Shall not be sent and if received the Cause shall be treated as an invalid IE |
| Request/ Initial message | 1 | Reserved |
| | 2 | Local Detach |
| | 3 | Complete Detach |
| | 4 | RAT changed from 3GPP to Non-3GPP |
| | 5 | ISR deactivation |
| | 6 | Error Indication received from RNC/eNodeB |
| | 7 | IMSI Detach Only |
| | 8 | Reactivation Requested |
| | 9 | PDN reconnection to this APN disallowed |
| | 10 | Access changed from Non-3GPP to 3GPP |
| | 11 | PDN connection inactivity timer expires |
| | 12 | to establish PDN/PDP connection |
| | 13 | Small data |
| | 14 to 15 | Spare. This value range shall be used by Cause values in an initial/request message. See NOTE 5. |
| Acceptance in a Response/ triggered message. See NOTE 1. | 16 | Request accepted |
| | 17 | Request accepted partially |
| | 18 | New PDN type due to network preference |
| | 19 | New PDN type due to single address bearer only |
| | 20 | Report success/failure |
| | 21 to –63 | Spare. This value range shall be used by Cause values in an acceptance response/triggered message |

Figure 11:
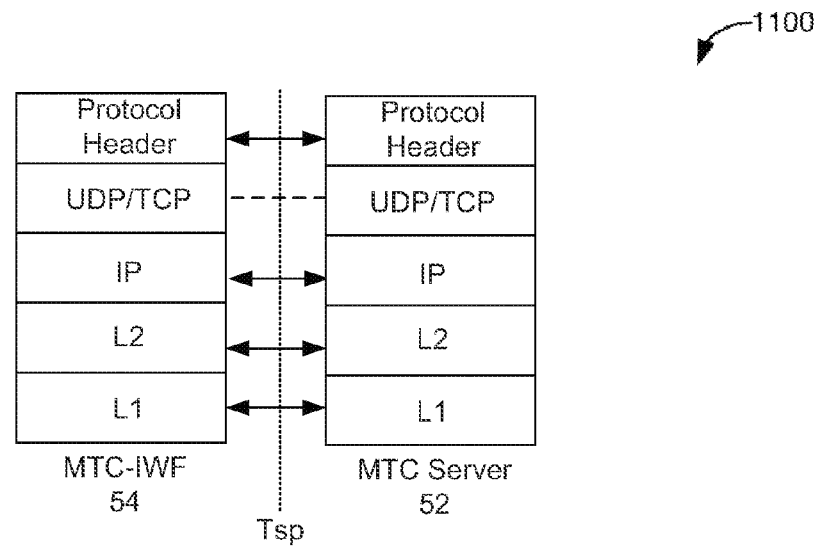
FIG. 11 schematically illustrates another example interface scheme between modules of a wireless communication system, in accordance with some embodiments.

FIG. 11 schematically illustrates another example interface scheme 1100 between modules of a wireless communication system, in accordance with some embodiments. In the interface scheme 1100, protocol stacks of the MTC-IWF 54 and the MTC server 52 may be configured to communicate over the references point Tsp, as indicated.

In some embodiments, the MTC-IWF 54 and the MTC server 52 have a protocol stack that includes L1, L2, IP, UDP and/or Transmission Control Protocol (UDP/TCP), and Protocol Header that are configured to communicate over the Tsp reference point, as can be seen. The Protocol Header may indicate a protocol of a message being sent over the Tsp reference point.

In some embodiments, the communications described herein that can be performed over the Tsp reference point may comport with the interface scheme 1100. For example, the trigger request sent at 302 of FIG. 3, the trigger acknowledgement sent at 304 of FIG. 3, and the trigger report sent at 314 of FIG. 3 may be a message sent or received in accordance with the MTC-AP protocol. The Protocol Header may indicate the MTC-AP. The MTC-AP may be configured to communicate using, for example, Hyper Text Transfer Protocol (HTTP), Session Initiation Protocol (SIP), and/or native protocols. The messages (e.g., sent at 302, 304, and 314 of FIG. 3) described herein may comport with other suitable protocols in other embodiments. In some embodiments, the MTC-IWF 54 may be configured to function as a translator, relay, or proxy according to the protocol being used to send or receive the message.

Figure 12:
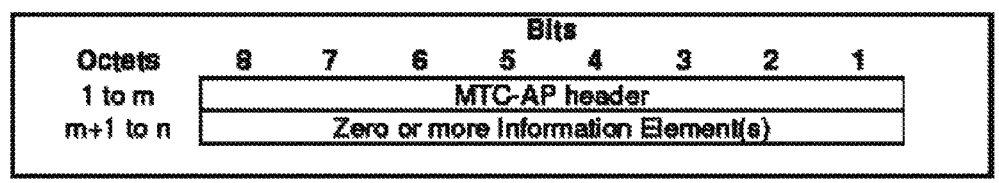
FIG. 12 schematically illustrates an example Machine Type Communication Application Protocol (MTC-AP) message format, in accordance with some embodiments.

FIG. 12 schematically illustrates an example MTC-AP message 1200 format, in accordance with some embodiments. The MTC-AP message 1200 may be used in messages (e.g., sent at 302, 304, 308, 312 and/or 314 of FIG. 3) that are sent over the T5a/T5b and Tsp reference points in accordance with the MTC-AP protocol.

In some embodiments, the MTC-AP message 1200 may include one or more bits to indicate features of the message. For example, in one embodiment, 1 to m octets may be used to indicate an MTC-AP header and m+1 to n octets may be used to indicate zero or more Information Element(s) (IEs), where m and n are integers. The MTC-AP message 1200 may have other suitable formats in other embodiments. The IEs included with the MTC-AP message 1200 may depend on the MTC-AP Message Type, which may be included in the MTC-AP header (e.g., MTC-AP header 1300 of FIG. 13).

Figure 13:
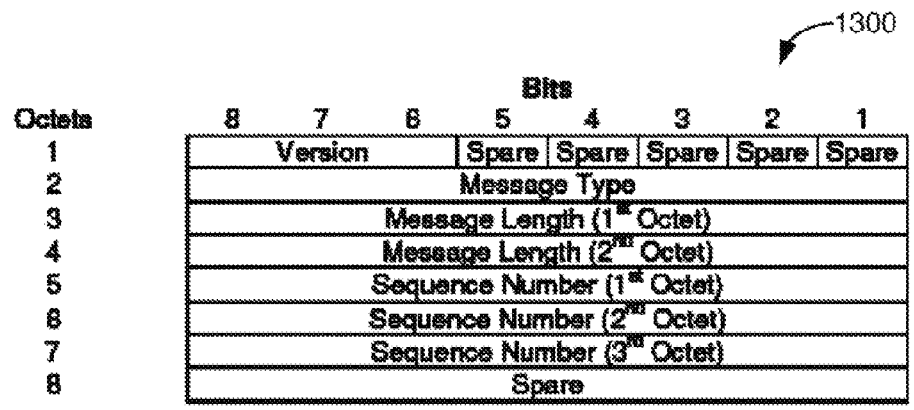
FIG. 13 schematically illustrates an example MTC-AP header format, in accordance with some embodiments.

FIG. 13 schematically illustrates an example MTC-AP header 1300 format, in accordance with some embodiments. The MTC-AP header 1300 may be used in messages that are sent over the T5a/T5b and/or Tsp reference points in accordance with the MTC-AP protocol.

In some embodiments, the MTC-AP header 1300 may include one or more bits to indicate features of the message. For example, in one embodiment, the MTC-AP header 1300 may include a first octet of eight bits to indicate Version (e.g., protocol version) and/or Spare features of the message, as can be seen A second octet may indicate a Message Type. In some embodiments, the Message Type may indicate a trigger notification (e.g., sent at 308 of FIG. 3) or trigger report (e.g., sent at 312 of FIG. 3). For example, the Message Type may have a Message Type value (Decimal) of 240 to indicate the trigger notification or a Message Type value (Decimal) of 241 to indicate the trigger report. According to various embodiments, the trigger notification is an initial Message Type and the trigger report is a triggered Message Type.

A third octet may indicate a Message Length (first octet). A fourth octet may indicate a Message Length (second octet). A fifth octet may indicate a Sequence Number (first octet). A sixth octet may indicate a Sequence Number corresponding (second octet). A seventh octet may indicate a Sequence Number corresponding (third octet). An eighth octet may indicate a Spare feature. The MTC-AP header 1300 may have other suitable formats in other embodiments.

The trigger notification and the trigger report may be sent over the T5a/T5b reference point in accordance with the MTC-AP message 1200 of FIG. 12 and the MTC-AP header 1300 of FIG. 13. Data such as the small data payload can be included in the Generic Data Container of the trigger report and/or the trigger notification in accordance with MTC-AP protocol. The trigger notification in accordance with the MTC-AP protocol may include the IEs as described in connection with Table 1 and FIGS. 7-10. The trigger report in accordance with the MTC-AP protocol may include the IEs as described in connection with Table 2 and in FIGS. 7, 9.

According to various embodiments, the trigger request (e.g., sent at 302 of FIG. 3) that is sent over the Tsp reference point according to the MTC-AP protocol may include IE(s) as described in Table 4.

network (e.g., BWA network 100 of FIG. 1), in accordance with some embodiments. Actions of the method 1400 may be performed by the MTC-IWF of FIGS. 2-3 or another module of the wireless communication network and may comport with techniques and configurations described in connection with FIGS. 1-13.

TABLE 4

Information Elements of the Trigger Request

| Information elements | P | Condition/Comment | IE Type | Ins. |
|---|---|---|---|---|
| Cause | CO | This may indicate the cause of triggering (e.g., to establish PDN/PDP connection or Send small data etc.) | Cause | 0 |
| External Identifier | M | External Identifier | External identifier | 0 |
| Validity Period | M | This IE indicates the duration for which the trigger needs to be stored. | Validity Period | 0 |
| Priority | O | Priority | Priority | 0 |
| Generic Data Container | O | This information container indicates the trigger, optionally carries data if any. | F-Container | 0 |
| Private Extension | O | This IE may be sent on Tsp interfaces. | Private extension | VS |

In Table 4, the IE(s) may comport with embodiments described in connection with FIGS. 8-10. The External Identifier IE may indicate an external identifier using a Mobile Network Operator (MNO) domain name and a local identifier.

According to various embodiments, the trigger acknowledgement (e.g., sent at 304 of FIG. 3) that is sent over the Tsp reference point according to the MTC-AP protocol may include IE(s) as described in Table 5.

At 1402, the method 1400 includes receiving (e.g., at 302 of FIG. 3), from a Machine Type Communication (MTC) server, a trigger request to trigger sending of a data payload over a wireless communication network. In some embodiments, the trigger request may trigger sending of a first data payload from the MTC server to a target UE or sending of

TABLE 5

Information Elements of the Trigger Acknowledgment

| Information elements | P | Condition/Comment | IE Type | Ins. |
|---|---|---|---|---|
| Cause | M | This provides success and failure of the Trigger Notification | Cause | 0 |
| Back-off Timer | O | This IE informs MTC Server that network is overloaded and it needs to back-off before retrying | Back-off | 0 |
| Private Extension | O | This IE may be sent on Tsp interfaces. | Private extension | VS |

In Table 5, the IE(s) may include a Cause IE to indicate success and/or failure of the trigger notification, a Back-off Timer to indicate the MTC server that the network is overloaded and may need to back-off (wait for a preconfigured time) before retrying to send the trigger, and a Private Extension that may be sent on Tsp interfaces.

According to various embodiments, the trigger report (e.g., sent at 314 of FIG. 3) that is sent over the Tsp reference point according to the MTC-AP protocol may include IE(s) as described in Table 6.

a second data payload from the UE to the MTC server or both the sending of the first data payload from the MTC server and the sending of the second data payload from the UE to the MTC server.

At 1404, the method 1400 may further include sending (e.g., at 304 of FIG. 3), to the MTC server, a trigger acknowledgement. The trigger acknowledgement may be sent in response to receiving the trigger request.

At 1406, the method 1400 may further include communicating (e.g., at 306 of FIG. 3) with a module including a

TABLE 6

Information Elements of the Trigger Report

| Information elements | P | Condition/Comment | IE Type | Ins. |
|---|---|---|---|---|
| Cause | M | This provides success and failure of the Trigger Notification | Cause | 0 |
| External Identifier | M | External Identifier | IMSI | 0 |
| Generic Data Container | O | This information container indicates the trigger, optionally carries data if any. | F-Container | 0 |
| Private Extension | O | This IE may be sent on Tsp interfaces. | Private extension | VS |

Figure 14:
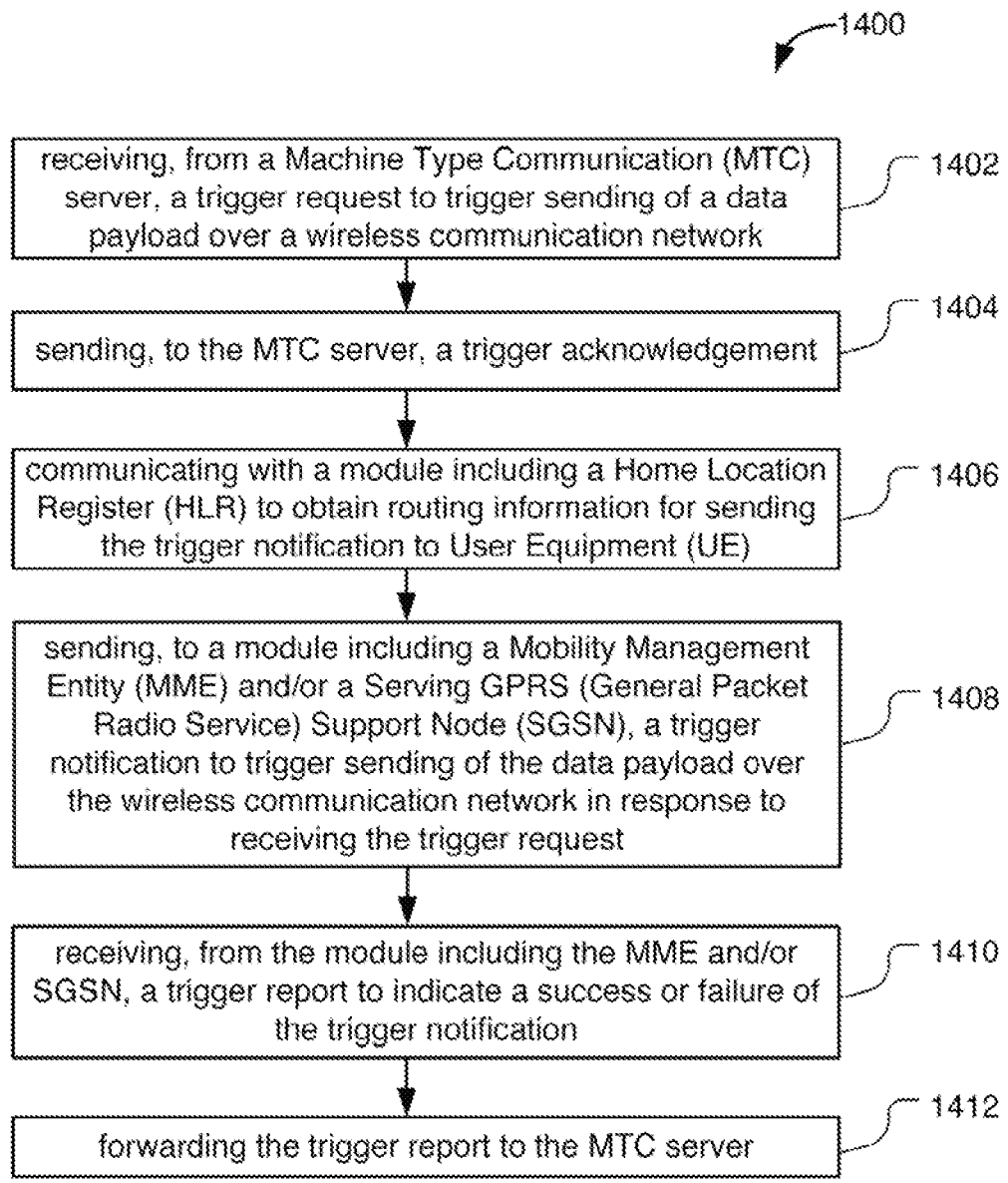
FIG. 14 is a flow diagram of a method for triggering transmission of a data payload in a wireless communication network, in accordance with some embodiments.

FIG. 14 is a flow diagram of a method 400 for triggering transmission of a data payload in a wireless communication network (e.g., BWA network 100 of FIG. 1), in accordance Home Location Register (HLR) (e.g., HLR/HSS 56 of FIG. 3) to obtain routing information for sending the trigger notification to User Equipment (UE). The communication with the HLR may take place in response to receiving the trigger request.

At 1408, the method 1400 may further include sending (e.g., at 308 of FIG. 3), to a module including a Mobility Management Entity (MME) and/or a Serving GPRS (General Packet Radio Service) Support Node (SGSN) (e.g., the SGSN/MME 58 of FIG. 3), a trigger notification to trigger sending of the data payload over the wireless communication network in response to receiving the trigger request. The trigger notification may trigger sending of the first data payload and/or the second data payload over the wireless communication network. The trigger notification may be sent in response to the trigger request.

At 1410, the method 1400 may further include receiving (e.g., at 312 of FIG. 3), from the module including the MME and/or SGSN, a trigger report to indicate a success or failure of the trigger notification. The trigger report may be sent in response to the trigger notification. At 1412, the method 1400 may further include forwarding (e.g., at 314 of FIG. 3) the trigger report to the MTC server.

Figure 15:
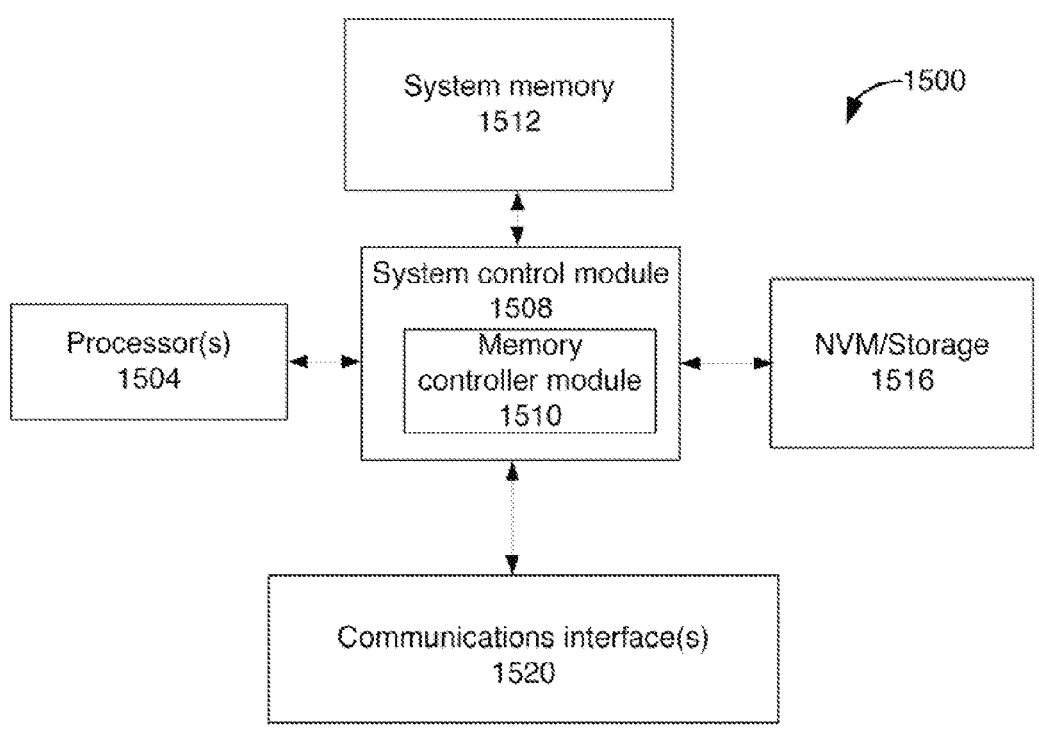
FIG. 15 schematically illustrates an example system that may be used to practice various embodiments described herein.

Embodiments of the present disclosure may be implemented into a system using any suitable hardware and/or software to configure as desired FIG. 15 schematically illustrates an example system that may be used to practice various embodiments described herein. FIG. 15 illustrates, for one embodiment, an example system 1500 having one or more processor(s) 1504, system control module 1508 coupled to at least one of the processor(s) 1504, system memory 1512 coupled to system control module 1508, non-volatile memory (NVM)/storage 1516 coupled to system control module 1508, and one or more communications interface(s) 1520 coupled to system control module 1508.

In some embodiments, the system 1500 may be capable of functioning as the UE 15 as described herein. In other embodiments, the system 1500 may be capable of functioning as the one or more servers 50 of FIG. 1 or otherwise provide logic/module that performs functions as described for a base station 40, one or more nodes, MTC Server 52, MTC-IWF 54, HLR/HSS 56, SGSN/MME 58, RAN 20, GGSN/PGW 51, and/or other modules described herein. In some embodiments, the system 1500 may include one or more computer-readable media (e.g., system memory or NVM/storage 1516) having instructions and one or more processors (e.g., processor(s) 1504) coupled with the one or more computer-readable media and configured to execute the instructions to implement a module (e.g., an interworking function) to perform actions described herein.

System control module 1508 for one embodiment may include any suitable interface controllers to provide for any suitable interface to at least one of the processor(s) 1504 and/or to any suitable device or component in communication with system control module 1508.

System control module 1508 may include memory controller module 1510 to provide an interface to system memory 1512. The memory controller module 1510 may be a hardware module, a software module, and/or a firmware module.

System memory 1512 may be used to load and store data and/or instructions, for example, for system 1500. System memory 1512 for one embodiment may include any suitable volatile memory, such as suitable DRAM, for example. In some embodiments, the system memory 1512 may include double data rate type four synchronous dynamic random-access memory (DDR4 SDRAM).

System control module 1508 for one embodiment may include one or more input/output (I/O) controller(s) to provide an interface to NVM/storage 1516 and communications interface(s) 1520.

The NVM/storage 1516 may be used to store data and/or instructions, for example. NVM/storage 1516 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 1516 may include a storage resource physically part of a device on which the system 1500 is installed or it may be accessible by, but not necessarily a part of, the device. For example, the NVM/storage 1516 may be accessed over a network via the communications interface(s) 1520.

Communications interface(s) 1520 may provide an interface for system 1500 to communicate over one or more network(s) and/or with any other suitable device. The system 1500 may wirelessly communicate with the one or more components of the wireless network in accordance with any of one or more wireless network standards and/or protocols.

For one embodiment, at least one of the processor(s) 1504 may be packaged together with logic for one or more controller(s) of system control module 1508, e.g., memory controller module 1510. For one embodiment, at least one of the processor(s) 1504 may be packaged together with logic for one or more controllers of system control module 1508 to form a System in Package (SiP). For one embodiment, at least one of the processor(s) 1504 may be integrated on the same die with logic for one or more controller(s) of system control module 1508. For one embodiment, at least one of the processor(s) 1504 may be integrated on the same die with logic for one or more controller(s) of system control module 1508 to form a System on Chip (SoC).

In various embodiments, the system 1500 may be, but is not limited to, a server, a workstation, a desktop computing device, or a mobile computing device (e.g., a laptop computing device, a handheld computing device, a tablet, a netbook, etc.). In various embodiments, the system 1500 may have more or less components, and/or different architectures. For example, in some embodiments, the system 1500 includes one or more of a camera, a keyboard, liquid crystal display (LCD) screen (including touch screen displays), non-volatile memory port, multiple antennas, graphics chip, application-specific integrated circuit (ASIC), and speakers.

According to various embodiments, the present disclosure describes an apparatus comprising one or more computer-readable media having instructions and one or more processors coupled with the one or more computer-readable media and configured to execute the instructions to implement an interworking function (IWF) to receive, from a Machine Type Communication (MTC) server, a trigger request to trigger sending of a data payload over a wireless communication network, the data payload being smaller than a preconfigured threshold and send, in response to the trigger request over a reference point to a module including a Mobility Management Entity (MME) or a Serving GPRS (General Packet Radio Service) Support Node (SGSN), a trigger notification to trigger sending of the data payload over the wireless communication network. In some embodiments, the data payload is a first data payload for uplink transmission from user equipment (UE) to the MTC server, the UE being configured to wirelessly communicate with the wireless communication network. In some embodiments, the trigger notification includes a second data payload for downlink transmission from the MTC server to the UE, the second data payload being smaller than the pre-configured threshold. In some embodiments, the module is a first module, the reference point is a first reference point and the IWF is further configured to communicate, in response to receiving the trigger request, with a second module including a Home Location Register (HLR) or Home Subscriber Server (HSS) over a second reference point to obtain routing information for sending the trigger notification to a user equipment (UE) over the first reference point.

In some embodiments, the reference point is a first reference point that terminates at the IWF and the IWF comprises a machine type communication interworking function (MTC-IWF) that is configured to terminate a second reference point to the MTC-IWF from the MTC server. In some embodiments, the MTC-IWF is configured to receive the trigger request over the second reference point.

In some embodiments, the IWF is further configured to send a trigger acknowledgement to the MTC server when the IWF is unable to process the trigger request. In some embodiments, the IWF is further configured to receive a trigger report from the module including the MME or the SGSN, the trigger report to indicate a success or failure of the trigger notification and forward the trigger report to the MTC server. In some embodiments, the trigger report includes the data payload. In some embodiments, the trigger notification is a GPRS (General Packet Radio Service) Tunneling Protocol (GTP) message or an MTC Application Protocol (MTC-AP) message. In some embodiments, the trigger request is an MTC-AP message.

In some embodiments, the trigger notification includes one or more information elements to provide a cause, user equipment (UE) identity, validity period, priority, generic data container, or private extension. In some embodiments, the wireless communication network includes a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. In some embodiments, the wireless communication network is accessible to a User Equipment (UE) via a GSM Enhanced Data for GSM Evolution (EDGE) Radio Access Network (GERAN), Universal Terrestrial Radio Access Network (UTRAN), or Evolved UTRAN (E-UTRAN).

According to various embodiments, the present disclosure describes a system comprising a Machine Type Communication (MTC) server configured to send a trigger request to trigger sending of a data payload over a wireless communication network, an interworking function (IWF) configured to receive the trigger request from the MTC server over a first reference point and to send, in response to the trigger request over a second reference point, a trigger notification to trigger sending of the data payload over the wireless communication network, and a module including a Mobility Management Entity (MME) or a Serving GPRS (General Packet Radio Service) Support Node (SGSN) configured to receive the trigger notification from the IWF. In some embodiments, the data payload is a first data payload for uplink transmission from user equipment (UE) to the MTC server, the UE being configured to wirelessly communicate with the wireless communication network, the data payload being smaller than a preconfigured threshold and the trigger notification includes a second data payload for downlink transmission from the MTC server to the UE, the second data payload being smaller than the pre-configured threshold.

In some embodiments, the module is a first module, the system further comprising a second module including a Home Location Register (HLR) or Home Subscriber Server (HSS), wherein the IWF is further configured to communicate, in response to receiving the trigger request, with the second module over a third reference point to obtain routing information for routing the trigger notification. In some embodiments, the IWF is further configured to send a trigger acknowledgement to the MTC server when the IWF is unable to process the trigger request. In some embodiments, the module is further configured to send, in response to receiving the trigger notification, a message to indicate the trigger request to user equipment (EU) that is configured to wirelessly communicate with the wireless communication network. In some embodiments, the module is further configured to send a trigger report to the IWF to indicate a success or failure of the message sent to indicate the trigger request to the UE. In some embodiments, the IWF is further configured to forward the trigger report to the MTC server and the MTC server is configured to establish, in response to receiving the trigger report, a user plane connection with the UE for sending of the data payload over the user plane connection.

According to various embodiments, the present disclosure describes a method comprising receiving, over a first reference point from a Machine Type Communication (MTC) server of a wireless communication network, a trigger request to trigger sending of a first data payload from the MTC server to user equipment (UE) or sending of a second data payload from the UE to the MTC server or both the sending of the first data payload from the MTC server and the sending of the second data payload from the UE to the MTC server. In some embodiments, the UE is configured to wirelessly communicate with the wireless communication network via a GSM Enhanced Data for GSM Evolution (EDGE) Radio Access Network (GERAN), Universal Terrestrial Radio Access Network (UTRAN), or Evolved UTRAN (E-UTRAN). In some embodiments, the first data payload and the second data payload are smaller than a preconfigured threshold. In some embodiments, the method further includes, in response to the trigger request, sending, over a second reference point to a module including a Mobility Management Entity (MME) or a Serving GPRS (General Packet Radio Service) Support Node (SGSN), a trigger notification to trigger sending of the first data payload and/or the second data payload over the wireless communication network.

In some embodiments, the module is a first module, the method further comprising, in response to receiving the trigger request, communicating with a second module including a Home Location Register (HLR) or Home Subscriber Server (HSS) over a third reference point to obtain routing information for sending the trigger notification to the user equipment (UE). In some embodiments, the method further includes sending a trigger acknowledgement to the MTC server in response to the trigger request. In some embodiments, the method further includes receiving a trigger report from the module, the trigger report to indicate a success or failure of the trigger notification. In some embodiments, the method further includes forwarding the trigger report to the MTC server.

According to various embodiments, the present disclosure describes an apparatus, comprising one or more computer-readable media having instructions and one or more processors coupled with the one or more computer-readable media and configured to execute the instructions to implement a first module including a Mobility Management Entity (MME) or a Serving GPRS (General Packet Radio Service) Support Node (SGSN) of a wireless communication network to receive, a trigger notification to trigger sending of a data payload from a user equipment (UE) to a Machine Type Communication (MTC) server over the wireless communication network. In some embodiments, the data payload is smaller than a preconfigured threshold. In some embodiments, the one or more processors are configured to execute the instructions to send, in response to receiving the trigger notification, a message to indicate the trigger notification to the UE, the UE being configured to wirelessly communicate with the wireless communication network. In some embodiments, the wireless communication network including a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network.

In some embodiments, the message that indicates the trigger notification to the UE is a Non-access Stratum (NAS) message. In some embodiments, the module is further configured to receive the data payload from the UE over a control plane of the wireless communication system. In some embodiments, the module is further configured to send a trigger report to indicate a success or failure of the trigger notification. In some embodiments, the trigger report includes the data payload received from the UE. In some embodiments, the trigger notification is a GPRS (General Packet Radio Service) Tunneling Protocol (GTP) message or an MTC Application Protocol (MTC-AP) message that is received by the module over a control plane of the wireless communication network. In some embodiments, the trigger notification includes one or more information elements to provide a cause, user equipment (UE) identity, validity period, priority, generic data container, or private extension. In some embodiments, the UE is configured to communicate with the wireless communication network via a GSM Enhanced Data for GSM Evolution (EDGE) Radio Access Network (GERAN), Universal Terrestrial Radio Access Network (UTRAN), or Evolved UTRAN (E-UTRAN).

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus comprising:
one or more computer-readable media having instructions; and one or more processors coupled with the one or more computer-readable media and the one or more processors are to execute the instructions to implement an interworking function (IWF) to:
receive, from a machine type communication (MTC) server over a Tsp reference point, a trigger request comprising a first container and a second container, wherein:
the first container includes a value to indicate a message type of the trigger request, and
the second container includes:
a trigger to cause transmission of a first data payload in an uplink transmission over a wireless communication network from a user equipment (UE) to the MTC server, wherein the first data payload is smaller than a preconfigured threshold, and
a second data payload for downlink transmission from the MTC server to the UE, wherein the second data payload is smaller than the preconfigured threshold;
send, when the apparatus is able to process the trigger request and in response to the trigger request, a trigger notification over a T5 reference point to a node comprising a Mobility Management Entity (MME) or a Serving GPRS (General Packet Radio Service) Support Node (SGSN), wherein the trigger notification comprises the trigger and the second payload;
send, when the apparatus is unable to process the trigger request, a trigger acknowledgment to the MTC server over the Tsp reference point to indicate that the apparatus was unable to process the trigger request; and
send, to the MTC server over the Tsp reference point, a trigger report, wherein the trigger report is to indicate a success or failure of delivery of a message to the UE, wherein the message is to trigger sending the first data payload based on the trigger request.

2. The apparatus of claim 1, wherein:
the second data payload for downlink transmission from the MTC server to the UE is to trigger the UE to perform one or more actions.

3. The apparatus of claim 1, wherein:
the node is a first node; and
the IWF is further to communicate, in response to receiving the trigger request, with a second node including a Home Location Register (HLR) over a S6m reference point to obtain routing information for sending the trigger notification over the T5 reference point.

4. The apparatus of claim 1, wherein:
the T5 reference point terminates at the IWF; and
the IWF comprises a machine type communication interworking function (MTC-IWF) that is to terminate the Tsp reference point to the MTC-IWF from the MTC server.

5. The apparatus of claim 1, wherein the IWF is further to send a trigger acknowledgement to the MTC server when the IE is unable to process the trigger request due to overload at the IWF.

6. The apparatus of claim 1, wherein the IWF is further to:
receive a trigger report from the node including the MME or the SGSN, the trigger report to indicate a success or failure of the trigger notification;
and forward the trigger report to the MTC server.

7. The apparatus of claim 6, wherein the trigger report includes the first data payload.

8. The apparatus of claim 1, wherein:
the trigger notification is a GPRS (General Packet Radio Service) Tunneling Protocol (GTP) message or an MTC Application Protocol (MTC-AP) message; and
the trigger request is an MTC-AP message.

9. The apparatus of claim 1, wherein the trigger notification includes one or more information elements to provide a cause, user equipment (UE) identity, validity period, priority, generic data container, or private extension.

10. The apparatus of claim 1, wherein:
the wireless communication network includes a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network; and the wireless communication network is accessible to the UE via a GSM Enhanced Data for GSM Evolution (EDGE) Radio Access Network (GERAN), Universal Terrestrial Radio Access Network (UTRAN) or Evolved UTRAN (E-UTRAN).

11. A method to indicate a delivery status of a device trigger message and a trigger payload, comprising:

transmitting, by a user equipment (UE) adapted for machine type communication MTC) in a public land mobile network (PLMN), a message to indicate reception of the device trigger message and the trigger payload, the message being transmitted to a node comprising a mobile management entity (MME) or a Serving General Packet Radio Service Support Node (SGSN) adapted to receive a trigger notification from an MTC interworking function (MTC-IWF) over a T5 reference point, wherein the trigger payload comprises a first data payload for a downlink transmission from an MTC server to the UE and information to cause transmission of a second data payload in an uplink transmission from the UE to the MTC server, wherein the MTC-IWF is adapted to:
receive a trigger request over a Tsp reference point from the MTC server; wherein the trigger request comprises:
a first container including a value to indicate a message type of the trigger request, and
a second container including the trigger payload from the MTC server,
and
send, to the MTC server over the Tsp reference point, a trigger report to indicate a success or failure of the device trigger message to the UE, and
send a trigger acknowledgement to the MTC server over; the Tsp reference point when the MTC-IWF is unable to process the trigger request; and
initiating, by the UE, communication with the MTC server.

12. The method of claim 11, wherein:
the UE is to wirelessly communicate in the PLMN, and the trigger report is to indicate an acceptance of the trigger request.

13. The method of claim 11, wherein the node is a first node, the PLMN further comprising:
a second node including a Home Location Register (HLR) or Home Subscriber Server (HSS), wherein the MTC-IWF is further to communicate, in response to receiving the trigger request, with the second node over a S6m reference point to obtain routing information for routing the trigger.

14. The method of claim 11, wherein the node is further to send, in response to receiving the trigger notification, a message to indicate the trigger request to the UE.

15. The method of claim 14, wherein the node is further to send a trigger report to the MTC-IWF to indicate a success or failure of the message sent to indicate the trigger request to the UE.

16. The method of claim 15, wherein:
the MTC-IWF is further to forward the trigger report to the MTC server; and the MTC server is to establish, in response to receiving the trigger report, a user plane connection with the UE for sending of the trigger payload over the user plane connection.

17. A method comprising:
receiving, by a Machine Type Communication interworking function (MTC-IWF) over a Tsp reference point from a Machine Type Communication (MTC) server of a wireless communication network, a trigger request comprising a first container and a second container, wherein:
the first container includes a value to indicate a message type of the trigger request, and
the second container includes:
a trigger to cause transmission of a first data payload in an uplink transmission from a user equipment (UE) to the MTC server, wherein the first data payload is smaller than a preconfigured threshold, and
a second data payload for downlink transmission from the MTC server to the UE, wherein the second data payload is smaller than the preconfigured threshold,
wherein the UE is adapted to wirelessly communicate with the wireless communication network via a GSM Enhanced Data for GSM Evolution (EDGE) Radio Access Network (GERAN), Universal Terrestrial Radio Access Network (UTRAN) or Evolved UTRAN (E-UTRAN), and wherein the first data payload and the second data payload are smaller than a preconfigured threshold;
when the MTC-IWF is able to process the trigger request and in response to the trigger request, sending, over T5 reference point to a node including a Mobility Management Entity (MME) or a Serving General Packet Radio Service Support Node (SGSN), a trigger notification to trigger sending of the first data payload over the wireless communication network, wherein the trigger notification comprises the second data payload and the trigger: and
when the MTC-IWF is unable to process the trigger request, sending, by the MTC-IWF to the MTC server over the Tsp reference point, a trigger acknowledgement indicating that the MTC-IWF was unable to process the trigger request; and
sending, by the MTC-IWF to the MTC server over the Tsp reference point, a trigger report, wherein the trigger report is to indicate a success or failure of delivery of a message to the UE, wherein the message is to trigger sending the first data payload based on the trigger request.

18. The method of claim 17, wherein the node is a first node, the method further comprising:
in response to receiving the trigger request, communicating with a second node including a Home Location Register (HLR) over a S6m reference point to obtain routing information for sending the trigger notification to the user equipment (UE).

19. The method of claim 17, further comprising:
sending the trigger acknowledgement to the MTC server in response to the trigger request due to overload at the MTC-IWF.

20. The method of claim 17, further comprising:
receiving a trigger report from the node, wherein the trigger report is to indicate a success or failure of the trigger notification and to indicate an acceptance of the message of the trigger request upon delivery of the message.

21. The method of claim 20, further comprising:
forwarding the trigger report to the MTC server.

22. An apparatus, comprising:
one or more computer-readable media having instructions; and one or more processors coupled with the one or more computer-readable media, and the one or more processors are to execute the instructions to implement a first node including a Mobility Management Entity (MME) or a Serving General Packet Radio Service Support Node (SGSN) of a wireless communication network to:

receive a trigger notification over a T5 reference point, the trigger notification comprising a first container and a second container, wherein:

the first container includes a value to indicate a message type of a trigger request, and the second container includes a trigger to cause transmission of a first data payload in an uplink transmission from a user equipment (UE) to a Machine Type Communication (MTC) server over the wireless communication network, and a second data payload for downlink transmission from the MTC server to the UE, wherein the first data payload and the second data payload are smaller than a preconfigured threshold, wherein the node is to receive the trigger notification from an MTC interworking function (MTC-IWF) in response to receipt of a trigger request from the MTC server over a Tsp reference point, and the MTC-IWF is adapted to send a trigger acknowledgement to the MTC server over the Tsp reference point when the MTC-IWF is unable to process the trigger request, and the MTC-IWF is adapted to send a first trigger report to the MTC server over the Tsp reference point to indicate acceptance of the trigger notification;

send, in response to receipt of the trigger notification, a message to indicate the trigger notification to the UE, wherein the message includes the trigger and the second data payload for downlink transmission from the MTC server to the UE, and wherein the UE is adapted to wirelessly communicate with the wireless communication network, the wireless communication network including a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network; and send, to the MTC-IWF, a second trigger report, wherein the trigger report is to indicate a success or failure of delivery of the message to the UE, and wherein the success or failure indicated by the second trigger report is to be included in the first trigger report.

23. The apparatus of claim 22, wherein the message that indicates the trigger notification to the UE is a lion-access Stratum (NAS) message.

24. The apparatus of claim 22, wherein;

the node is further to receive the first data payload from the UE over a control plane of the wireless communication network:

the node is further to send the second trigger report to indicate a success or failure of the trigger notification, and to indicate acceptance of the message at the UE;

the second trigger report includes the first data payload received from the UE; the trigger notification is a General Packet Radio Service Tunneling Protocol (GTP) message or an MTC Application Protocol (MTC-AP) message that is received by the node over a control plane of the wireless communication network;

the trigger notification includes one or more information elements to provide a cause, user equipment (UE) identity, validity period, priority, generic data container, or private extension; and the UE is to communicate with the wireless communication network via a GSM Enhanced Data for GSM Evolution (EDGE) Radio Access Network (GERAN), Universal Terrestrial Radio Access Network (UTRAN) or Evolved UTRAN (E-UTRAN).

25. An apparatus comprising:

one or more computer-readable media having instructions; and one or more processors coupled with the one or more computer-readable media, wherein execution of the instructions is to cause a user equipment (UE) adapted for machine type communication (MTC) in a public land mobile network (PLMN) to indicate a delivery status of a device trigger message and a trigger payload, wherein, to indicate the delivery status, execution of the instructions is to cause the UE to:

transmit a message to indicate reception of the device trigger message and the trigger payload, wherein transmission of the message is to a node comprising a mobile management entity (MME) or a Serving General Packet Radio Service Support Node (SGSN), wherein the trigger payload comprises a first data payload to be sent in a downlink transmission from a Services Capability Server (SCS) to the UE and information to cause transmission of a second data payload in an uplink transmission from the UE to the SCS, wherein the node is adapted to receive a trigger notification from a MTC interworking function (MTC-IWF) over a T5 reference point, wherein the MTC-IWF is adapted to receive a trigger request over a Tsp reference point from the SCS, wherein the trigger request includes a first container and a second container, wherein the first container includes a value to indicate a message type of the trigger request and the second container includes the trigger payload, and send, to the SCS, a trigger report to indicate a success or failure of the device trigger message to the UE and wherein the MTC-IWF is further adapted to send a trigger acknowledgement to the MTC server when the MTC-1E is unable to process the trigger request; and initiate, in response to the device trigger message, communication with the SCS.

26. The apparatus of claim 25, wherein the second data payload is included with the message to indicate reception of the device trigger message and trigger payload, and the UE is to wirelessly communicate in the PLMN.

27. The apparatus of claim 25, wherein the one or more processors are to execute the instructions to cause the UE to receive the device trigger message and the trigger payload from the node.

28. The apparatus of claim 25, further comprising:

a sensor, wherein said transmitting a message to indicate reception of the device trigger message and the trigger payload includes information collected by the sensor.

29. The apparatus of claim 25, wherein the PLMN is accessible to the UE via a GSM Enhanced Data for GSM Evolution (EDGE) Radio Access Network (GERAN), Universal Terrestrial Radio Access Network (UTRAN) or Evolved UTRAN (E-UTRAN).

* * * * *

UNITED STATES PATENT AND TRADEMARK OFFICE
CERTIFICATE OF CORRECTION

PATENT NO. : 9,755,882 B2  
APPLICATION NO. : 13/996320  
DATED : September 5, 2017  
INVENTOR(S) : Jain et al.

Page 1 of 1

It is certified that error appears in the above-identified patent and that said Letters Patent is hereby corrected as shown below:

In the Claims

Column 23  
Line 12, Claim 11 add a --(-- before --MTC)--.  
Line 38, Claim 11 delete the ";" after --over--.

Column 24  
Line 27, Claim 17 replace "over T5" with --over a T5--.

Column 26  
Line 44, Claim 25 replace "MTC-1E" with --MTC-IWF--.

Signed and Sealed this  
Thirty-first Day of October, 2017

Joseph Matal  
*Performing the Functions and Duties of the*  
*Under Secretary of Commerce for Intellectual Property and*  
*Director of the United States Patent and Trademark Office*